(12) United States Patent
Nakashima et al.

(10) Patent No.: US 12,209,194 B2
(45) Date of Patent: Jan. 28, 2025

(54) NONAQUEOUS INKJET INK COMPOSITION

(71) Applicant: SAKATA INX CORPORATION, Osaka (JP)

(72) Inventors: Okinori Nakashima, Osaka (JP); Yoshiyuki Aoki, Osaka (JP); Ryohei Miyake, Osaka (JP); Koki Ogasahara, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 489 days.

(21) Appl. No.: 17/764,036

(22) PCT Filed: Oct. 28, 2020

(86) PCT No.: PCT/JP2020/040527
§ 371 (c)(1),
(2) Date: Mar. 25, 2022

(87) PCT Pub. No.: WO2021/085510
PCT Pub. Date: May 6, 2021

(65) Prior Publication Data
US 2023/0037165 A1 Feb. 2, 2023

(30) Foreign Application Priority Data
Oct. 30, 2019 (JP) .................. 2019-197474

(51) Int. Cl.
C09D 11/36 (2014.01)
C09D 11/107 (2014.01)

(52) U.S. Cl.
CPC ............ C09D 11/36 (2013.01); C09D 11/107 (2013.01)

(58) Field of Classification Search
CPC .................................................... C09D 11/36
See application file for complete search history.

(56) References Cited

U.S. PATENT DOCUMENTS

| 2008/0119593 A1 | 5/2008 | Stramel et al. | |
| 2016/0194508 A1* | 7/2016 | Yodo .................... | C09D 11/36 428/207 |
| 2018/0327620 A1 | 11/2018 | Sato et al. | |
| 2019/0144694 A1 | 5/2019 | Nakashima et al. | |

FOREIGN PATENT DOCUMENTS

| EP | 3330330 A1 | 6/2018 |
| EP | 3450514 A1 | 3/2019 |
| JP | 2005023298 A | 1/2005 |
| JP | 2005200469 A | 7/2005 |
| JP | 2008248008 A | 10/2008 |
| JP | WO2007072804 A1 | 5/2009 |
| JP | 2011052162 A | 3/2011 |
| JP | 2013189566 A | 9/2013 |
| JP | 2016155909 A | 9/2016 |
| JP | 2016160419 A | 9/2016 |
| JP | 2017031272 A | 2/2017 |
| JP | 2017218472 A | 12/2017 |
| JP | 2018095688 A | 6/2018 |
| WO | 2007072804 A1 | 6/2007 |
| WO | 2015020128 A1 | 2/2015 |

OTHER PUBLICATIONS

International Preliminary Report on Patentability, dated May 3, 2022, for corresponding international application PCT/JP2020/040527 (1 page).
Notification Concerning Transmittal of International Preliminary Report on Patentability, mailed May 12, 2022, for corresponding international application PCT/JP2020/040527 (1 page).
Notification of Transmittal of Translation of the International Preliminary Report on Patentability, mailed May 12, 2022, for corresponding international application PCT/JP2020/040527 (1 page).
Written Opinion of the International Searching Authority, mailed Jan. 19, 2021, for corresponding international application PCT/JP2020/040527 (4 page).
Extended European Search Report (EESR) dated Oct. 25, 2023, issued for European counterpart patent application No. EP20880997.0 (5 pages).
International Search Report (ISR) mailed Jan. 19, 2021, issued for International application No. PCT/JP2020/040527 (3 pages).

\* cited by examiner

*Primary Examiner* — Ian A Rummel
(74) *Attorney, Agent, or Firm* — Law Office of Katsuhiro Arai

(57) ABSTRACT

A nonaqueous inkjet ink composition contains acrylic-based resin, pigment, pigment dispersant, and organic solvent, wherein the nonaqueous inkjet ink composition is characterized in that it contains propylene carbonate, diethylene glycol dialkyl ether, as well as tetraethylene glycol dialkyl ether, as the organic solvent, and is compounded in a manner that the propylene carbonate accounts for 1.0 to 20.0% by mass in the ink composition and the content of the diethylene glycol dialkyl ether relative to the propylene carbonate content, or "diethylene glycol dialkyl ether/propylene carbonate," falls between 9.0 and 20.0.

12 Claims, No Drawings

NONAQUEOUS INKJET INK COMPOSITION

CROSS-REFERENCE TO RELATED APPLICATIONS

This application is the U.S. National Phase under 35 U.S.C. § 371 of International Application PCT/JP2020/040527, filed Oct. 28, 2020, which claims priority to Japanese Patent Application No. JP2019-197474, filed Oct. 30, 2019. The International Application was published under PCT Article 21(2) in a language other than English.

TECHNICAL FIELD

The present invention relates to a nonaqueous inkjet ink composition suitable for manufacturing large billboard ads, etc., whose printing face is primarily constituted by a vinyl chloride-based polymer or ethylene-vinyl acetate-based copolymer, as well as a printed matter obtained by using the same.

BACKGROUND ART

Recent billboard ads increasingly feature vivid, sophisticated design logos and patterns, as well as photographic images of exterior views of products or human faces. Additionally, in terms of billboard size, there are now quite a few large billboards that are intended to leave stronger impressions on the viewers. Traditionally, general methods for manufacturing billboard ads included cutting out colored sheets in the shapes of letters and pasting them for those featuring logos, and utilizing various types of printing presses for those featuring photographic images. This made manufacturing of billboard ads time-consuming and labor-intensive, and the need for printing presses and other large-scale equipment also presented challenges.

Accordingly, attempts are made to utilize the inkjet method, which allows a design created on a personal computer to be directly printed on a base material, in order to make manufacturing of billboards featuring vivid images easier.

One unique aspect of the inkjet method is that it accommodates a wide range of materials that can be utilized as base materials for printing, allowing printing on sheets of paper, polymer, metal, and other hard/soft materials with ease. Particularly for billboard ads that are installed outdoors, the performance requirements include being light-weight, exceptionally strong and durable, rain-resistant, and inexpensive; therefore, the ability to print on polymer sheets having these properties is a great advantage.

Additionally, super-wide-format inkjet printers boasting a printing width of over 2,000 mm have emerged of late, rendering billboard manufacturing much easier by, for example, making large printed matters that traditionally required pasting printable all at once.

In general, tarpaulin is a frequent choice as a polymer sheet used for billboard ads. It should be noted that tarpaulin is a composite sheet comprising polyester or polyamide as a core material, with a polyvinyl chloride, ethylene-vinyl acetate copolymer or other vinyl-based polymer layered on top and bottom thereof.

Among the inkjet ink compositions used for printing on these composite sheets are nonaqueous inkjet ink compositions based on organic solvents (environmentally-friendly organic solvents in recent years). Nonaqueous inkjet ink compositions must use materials having good wettability, drying property, fixing property, etc., on the polyvinyl chloride, ethylene-vinyl acetate copolymer and other vinyl-based polymers being the top face materials of the composite sheets.

Accordingly, the art of utilizing an alkylene glycol monoether monoester, or cyclic ester as an organic solvent (refer to Patent Literature 1), the art of using a vinyl-based polymer as a binder resin and, as an organic solvent, one that contains a specific amount of environmentally-friendly polyalkylene glycol dialkyl ether (refer to Patent Literature 2), and the art of containing specific amounts of diethylene glycol ethyl methyl ether and propylene carbonate as an organic solvent (refer to Patent Literature 3), are publicly known.

However, there has been a demand for higher printing speeds in recent years, and in printing of conventional nonaqueous inkjet ink compositions (particularly nonaqueous inkjet ink compositions using environmentally-friendly organic solvents), insufficient filling of solid areas (hereinafter referred to as "solid filling property"), poor cissing inhibition property of ink, discharge stability, and ease of maintenance, and occurrence of mottling, have presented challenges.

BACKGROUND ART LITERATURE

Patent Literature

Patent Literature 1: Japanese Patent Laid-open No. 2005-200469
Patent Literature 2: International Patent Laid-open No. WO2007/072804
Patent Literature 3: International Patent Laid-open No. WO2015/020128
Patent Literature 4: Japanese Patent Laid-open No. 2017-31272

SUMMARY OF THE INVENTION

Problems to Be Solved by the Invention

An object of the present invention is to provide a nonaqueous inkjet ink composition offering excellent wettability, fixing property, cissing inhibition property of ink, solid filling property and anti-mottling property, as well as excellent discharge stability and ease of maintenance along with high flash point, even when printed at high speed on printing targets whose printing face is constituted by a polyvinyl chloride, ethylene-vinyl acetate copolymer or other vinyl-based polymer, etc.

Means for Solving the Problems

After studying in earnest to achieve the aforementioned object, the inventors of the present invention found that the aforementioned object could be achieved by using an organic solvent having a specific composition, and eventually completed the present invention.

To be specific, the present invention encompasses the following:
1. A nonaqueous inkjet ink composition containing acrylic-based resin, pigment, pigment dispersant, and organic solvent, wherein the nonaqueous inkjet ink composition contains, as the organic solvent:
   propylene carbonate by 1.0 to 20.0% by mass in the ink composition;
   diethylene glycol dialkyl ether in a manner that the content of diethylene glycol dialkyl ether relative to that of propylene carbonate, or "diethylene glycol dialkyl ether/propylene carbonate," falls between 9.0 and 20.0 based on mass ratio; and tetraethylene glycol dialkyl ether by 5.0 to 25.0% by mass in the ink composition.

2. The nonaqueous inkjet ink composition according to 1, wherein the diethylene glycol dialkyl ether comprises diethylene glycol ethyl methyl ether and/or diethylene glycol diethyl ether.

3. The nonaqueous inkjet ink composition according to 1 or 2, wherein the acrylic-based resin is formulated in a manner that it contains acrylic-based resin (A) whose glass transition temperature is 90 to 110° C. and mass-averaged molecular weight is 20,000 to 80,000, and acrylic-based resin (B) whose glass transition temperature is 65 to 85° C. and mass-averaged molecular weight is 50,000 to 80,000, at a ratio (A)/(B) of 70 to 90/10 to 30.

4. The nonaqueous inkjet ink composition according to any one of 1 to 3, containing vinyl chloride-vinyl acetate-based resin.

Effects of the Invention

The nonaqueous inkjet ink composition proposed by the present invention contains acrylic-based resin, pigment, pigment dispersant, and organic solvent of specific compositions.

This way, it can demonstrate, as an ink composition, effects such as sufficiently high flash point, excellent safety, prevention of voids, good solid filling property/anti-mottling property/ease of maintenance, and good discharge stability from inkjet printer nozzles.

MODE FOR CARRYING OUT THE INVENTION

Acrylic-Based Resin

The acrylic-based resin contained in the nonaqueous inkjet ink composition proposed by the present invention may be a polymer constituted by any (meth)acrylate that can dissolve in organic solvents, a copolymer of such polymers, etc. Such (meth)acrylate may be, for example, ethyl, propyl, or butyl (meth)acrylate, or other alkyl (meth)acrylate; hydroxymethyl, hydroxyethyl, hydroxypropyl, hydroxybutyl, hydroxypentyl (meth)acrylate, or other hydroxyalkyl (meth)acrylate, etc.

Examples include BR-60 (Tg: 75° C.), BR-64 (Tg: 55° C.), BR-75 (Tg: 90° C.), BR-77 (Tg: 80° C.), BR-83 (Tg: 105° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), and BR-116 (Tg: 50° C.) manufactured by Mitsubishi Chemical Corporation, for example.

Such acrylic-based resin contains acrylic-based resin (A) whose glass transition temperature is 90 to 110° C. and mass-averaged molecular weight is 20,000 to 80,000, and acrylic-based resin (B) whose glass transition temperature is 65 to 85° C. and mass-averaged molecular weight is 50,000 to 80,000, at a ratio (A)/(B) of preferably 70 to 90/10 to 30, or more preferably 75 to 90/10 to 25, and yet more preferably 75 to 85/15 to 25.

The content of acrylic-based resin relative to the total amount of nonaqueous inkjet ink composition is preferably 1.0 to 15.0% by mass, or more preferably 2.0 to 10.0% by mass, or yet more preferably 3.0 to 7.5% by mass.

If the content of acrylic-based resin is under 1.0% by mass, the fixing property on the base material becomes insufficient; if the content used exceeds 15.0% by mass, on the other hand, the solids content increases excessively, and the discharge stability drops as a result.

It should be noted that, to the extent that it does not reduce the performance, any resins other than the aforementioned acrylic-based resin, such as vinyl chloride-based resin, vinyl chloride-vinyl acetate-based resin, ethylene-vinyl acetate-based resin, styrene-acrylic-based resin, styrene-maleic acid-based resin, rosin-based resin, rosin ester-based resin, petroleum resin, cumarone indene-based resin, terpen phenol-based resin, phenol resin, urethane resin, melamine resin, urea resin, epoxy-based resin, cellulose-based resin, xylene resin, alkyd resin, aliphatic hydrocarbon resin, butyral resin, maleic acid resin, fumaric acid resin, etc., may also be combined.

And, particularly when any vinyl chloride-vinyl acetate-based resin is combined, the vinyl chloride-vinyl acetate-based resin may be compounded preferably by 1 to 15 parts by mass, or more preferably by 2 to 12 parts by mass, or yet more preferably by 3 to 10 parts by mass, relative to 100 parts by mass of acrylic-based resin.

For such vinyl chloride-vinyl acetate-based resin, preferably a vinyl chloride-vinyl acetate-based resin of 85% vinyl chloride and 15% vinyl acetate is used.

Pigment

For the pigment contained in the nonaqueous inkjet ink composition proposed by the present invention, any of the known inorganic pigments, organic pigments, etc., traditionally used in nonaqueous inkjet ink compositions may be used.

Specific examples of such inorganic pigments include carbon black, titanium oxide, zinc flower, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

Also, specific examples of organic pigments include azo-based, azomethine-based polyazo-based, phthalocyanine-based, quinacridone-based, anthraquinone-based, indigo-based, thioindigo-based, quinophthalone-based, benzimidazolone-based, isoindoline-based, isoindolinone-based, and other organic pigments, where specific examples as expressed by the color index include Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, Pigment Orange 36, 43, 51, 55, 59, 61, 71, 74, etc.

Any one type of these pigments may be used alone or two or more types may be combined, where the amount used is 1.0 to 10.0% by mass, or more preferably 2.0 to 7.0% by mass, relative to the total amount of nonaqueous inkjet ink composition. If the amount of pigment used is less than 1.0% by mass, the coloring strength tends to be insufficient, while an amount exceeding 10.0% by mass tends to cause the viscosity to rise and ink fluidity to drop.

Pigment Dispersant

For the pigment dispersant contained in the nonaqueous inkjet ink composition proposed by the present invention, any ionic or nonionic surfactant or anionic, cationic, or nonionic high-molecular compound may be used, for example.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 that are basic functional group-containing copolymers (manufactured by Ajinomoto Fine-Techno Co., Inc.) (acid value and amine value are both 10 to 20 mgKOH/g), SOLSPERSE 56000 (manufactured by Lubrizol Corporation), SOLSPERSE 39000 (manufactured by Lubrizol Corporation), DISPERBYK (manufactured by BYK-Chemie GmbH), etc., are preferred. Any one type of these pigment dispersants may be used alone, or two or more types may be combined.

In particular, basic functional group-containing copolymers with an amine value of 10 to 40 mgKOH/g are preferred.

It should be noted that any of the aforementioned pigment dispersants may be selected and used as deemed appropriate according to the type of pigment and type of organic solvent used.

Organic Solvent

The organic solvent contained in the nonaqueous inkjet ink composition proposed by the present invention comprises firstly 1.0 to 20.0% by mass of propylene carbonate in the ink composition, as well as tetraethylene glycol dialkyl ether.

Furthermore, diethylene glycol dialkyl ether must be used in such a way that its content relative to that of propylene carbonate, or "diethylene glycol dialkyl ether/propylene carbonate," falls between 9.0 and 20.0, or preferably between 10.0 and 18.0, or more preferably between 12.0 and 16.0, or most preferably between 13.0 and 15.0.

By using diethylene glycol dialkyl ether and propylene carbonate in these ranges, excellent wettability, fixing property, and solid filling property can be achieved, along with excellent discharge stability, even in high-speed printing.

Also, preferably diethylene glycol dialkyl ether is used by 40.0 to 80.0% by mass in the nonaqueous inkjet ink composition, while propylene carbonate may be used preferably by 4.0 to 20.0% by mass, or from the viewpoint of further improving the printed image quality, more preferably by 3.0 to 18.0% by mass, or most preferably by 5.0 to 15.0% by mass, in the nonaqueous inkjet ink composition.

Additionally, it is necessary that the nonaqueous inkjet ink composition contains tetraethylene glycol alkyl ether, where its content is 5.0 to 25.0% by mass, or preferably 10.0 to 20.0% by mass, or more preferably 12.0 to 18.0% by mass, or yet more preferably 13.0 to 18.0% by mass.

For the diethylene glycol dialkyl ether, preferably at least one type selected from diethylene glycol ethyl methyl ether, diethylene glycol diethyl ether, and diethylene glycol dibutyl ether is used, or any other diethylene glycol dialkyl ether may also be combined.

For the tetraethylene glycol dialkyl ether, one whose two alkyl groups each independently represent preferably an alkyl group with 12 or less carbon atoms, or more preferably an alkyl group with 6 or less carbon atoms, or yet more preferably an alkyl group with 3 or less carbon atoms, may be adopted.

Also, besides diethylene glycol dialkyl ether and tetraethylene glycol dialkyl ether, an alkylene glycol derivative with a flash point of 50 to 150° C. may also be combined in order to adjust the drying property and further improve the anti-mottling property.

Examples of such alkylene glycol derivatives with a flash point of 50 to 150° C. include, for example, triethylene glycol dimethyl ether, triethylene glycol diethyl ether, (poly) ethylene glycol dialkyl ether, propylene glycol dimethyl ether, propylene glycol diethyl ether, dipropylene glycol dimethyl ether, dipropylene glycol diethyl ether, tetrapropylene glycol diethyl ether, tetrapropylene glycol dimethyl ether, and other (poly)propylene glycol dialkyl ethers, propylene glycol monobutyl ether, dipropylene glycol monomethyl ether, dipropylene glycol monoethyl ether, and other (poly)propylene glycol monoalkyl ethers, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoalkyl ethers, ethylene glycol monomethyl ether acetate, ethylene glycol monoethyl ether acetate, ethylene glycol monobutyl ether acetate, diethylene glycol monomethyl ether acetate, triethylene glycol monomethyl ether acetate, and other (poly)ethylene glycol monoalkyl ether monoalkyl esters, ethylene glycol diacetate, diethylene glycol diacetate, triethylene glycol diacetate, and other (poly)ethylene glycol diesters, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol monopropyl ether acetate, triethylene glycol monomethyl ether acetate, triethylene glycol monoethyl ether acetate, triethylene glycol monobutyl ether acetate, and other (poly)ethylene glycol monoether monoesters.

Among the alkylene glycol derivatives with a flash point of 50 to 150° C., preferably diethylene glycol ethyl methyl ether and diethylene glycol diethyl ether are called to attention.

The content of the alkylene glycol derivative with a flash point of 50 to 150° C. in the nonaqueous inkjet ink composition is preferably 45.0 to 78.0% by mass, or most preferably 50.0 to 75.0% by mass.

Furthermore, any of lactone-based solvents may be compounded, where, for example, γ-butyrolactone is preferred. The content of lactone-based solvent is preferably 0.3 to 3.0% by mass, or more preferably 0.5 to 2.0% by mass, or yet more preferably 1.0 to 1.7% by mass, in the total ink composition.

Also, to the extent that it does not significantly change the flash point of the solvent as a whole, ethylene glycol diethyl ether, ethylene glycol dimethyl ether, propylene glycol monomethyl ether, propylene glycol monoethyl ether, propylene glycol monomethyl ether acetate, etc., whose flash point is not in a range of 50 to 150° C. may also be combined.

In addition, preferably the total amount of organic solvent accounts for 80.0 to 98.0% by mass in the total ink composition. If the aforementioned total amount exceeds 98.0% by mass, the printability of the obtained ink drops; if the total amount is under 80.0% by mass, on the other hand, a rise in ink viscosity is induced and the discharge property of the ink from the nozzle tends to drop, which is not desired.

Other Components

Furthermore, in the nonaqueous inkjet ink composition proposed by the present invention, various types of additives such as surfactant, plasticizer, surface conditioner, ultraviolet protective agent, photostabilizer, antioxidant, etc., may be used as necessary.

Manufacturing of Nonaqueous Inkjet Ink Composition

Next, how the nonaqueous inkjet ink composition proposed by the present invention is manufactured using these materials is explained.

The nonaqueous inkjet ink composition proposed by the present invention can be obtained by, for example, dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill, or other dispersion machine, and adjusting the viscosity of the nonaqueous inkjet ink composition to between 2 and 10 mPa·s.

Preferably the content of all organic solvents in the nonaqueous inkjet ink composition proposed by the present invention, which is the total amount of ink composition less the total sum of the amounts of binder resin, pigment, pigment dispersant, and other additives that may be used as necessary, is changed as deemed appropriate so as to bring the ink viscosity into the aforementioned range.

The thus obtained nonaqueous inkjet ink composition proposed by the present invention can be used with inkjet printers on base materials whose top face layer at least is constituted by a vinyl chloride-based polymer or ethylene-vinyl acetate-based copolymer.

Applications

The nonaqueous inkjet ink composition proposed by the present invention can be used in known applications, among which it is suited for situations where the ink composition is used on top face layers of nonabsorbent base materials. Nonabsorbent materials include metals, resins, ceramics, etc., but preferably the ink composition is used on top face layers of resin base materials, or more strictly on top face layers where this resin is constituted by a vinyl chloride-based polymer or ethylene-vinyl acetate-based copolymer, from the viewpoint of solid filling property, stickiness prevention, and other printing properties, etc.

EXAMPLES

The present invention is explained in greater detail below using examples; however, the present invention is not limited to these examples. It should be noted that, unless otherwise specified, "%" means "% by mass," while "part" means "part by mass."

The materials used in the Examples and Comparative Examples below are listed below. All components other than solvents are expressed in solids content.

In the table, the unit of values in the rows of Pigments, Dispersants, Resins, Solvents and Total is "% by mass."

<Pigments>
  MA7: Carbon Black MA7 (manufactured by Mitsubishi Chemical Corporation)
  G01: LEVASCREEN Yellow G01 (manufactured by Lanxess AG)
  RGT: FASTOGEN Super Magenta RGT (manufactured by DIC Corporation)
  D7110F HELIOGEN Blue D7110F (manufactured by BASF SE)

<Pigment Dispersants>
  PB822: AJISPER PB822 (manufactured by Ajinomoto Fine-Techno Co., Inc.)
  SOLSPERSE 56000 (manufactured by Lubrizol Corporation)
  SOLSPERSE 39000 (manufactured by Lubrizol Corporation)

<Resins>
  BR-87: DIANAL BR-87 (manufactured by Mitsubishi Chemical Corporation, glass transition temperature 105° C., mass-averaged molecular weight 25,000) (acrylic-based resin (A))
  BR-60: DIANAL BR-60 (manufactured by Mitsubishi Chemical Corporation, glass transition temperature 75° C., mass-averaged molecular weight 70,000) (acrylic-based resin (B))
  E15/45: VINNOL E15/45 (manufactured by Wacker Chemie AG, vinyl chloride-vinyl acetate-based resin of 85% vinyl chloride and 15% vinyl acetate, glass transition temperature 75° C., mass-averaged molecular weight 45,000 to 55,000)

Examples 1 to 12 and Comparative Examples 1 to 4

<Manufacturing of Nonaqueous Inkjet Ink Compositions>

According to the recipes in Table 1 (compounding ratio of each material is based on % by mass), the respective materials were mixed under agitation to obtain the nonaqueous inkjet ink compositions in Examples 1 to 12 and Comparative Examples 1 to 4.

<Printing Method>

The nonaqueous inkjet ink compositions in Examples 1 to 12 and Comparative Examples 1 to 4 were loaded in a commercial inkjet printer and printed solid on polyvinyl chloride sheets in a high-speed printing mode, to obtain the printed matters in Examples 1 to 12 and Comparative Examples 1 to 4.

These printed matters were measured/evaluated for the properties below.

In the evaluations below, ratings A and B indicate levels suitable for practical use, while ratings C and D indicate levels that fall short of practical use.

Viscosity

The 25° C. viscosity of each of the nonaqueous inkjet ink compositions in Examples 1 to 12 and Comparative Examples 1 to 4 was measured using a viscometer (manufactured by Toki Sangyo Co., Ltd., model: RE100L).

Solid Filling Property

Each of the nonaqueous inkjet ink compositions in Examples 1 to 12 and Comparative Examples 1 to 4 was printed solid on a polyvinyl chloride sheet (product name: MPI 1000 Series, manufactured by Avery Dennison Corporation) in a high-speed printing mode, and the result was visually evaluated for filling of solid areas based on whether or not the images have voids; that is, if the solid areas are filled properly.
Evaluation Criteria
  A: There are no voids.
  B: There are some voids.
  C: There are many voids.

Cissing Inhibition Property of Ink

Each of the nonaqueous inkjet ink compositions in Examples 1 to 12 and Comparative Examples 1 to 4 was printed solid in single color and in mixed colors (red, blue, green) on a polyvinyl chloride sheet (product name: MPI 1000 Series, manufactured by Avery Dennison Corporation) in a standard mode, and the result was visually evaluated for degree of formation of solid areas.
Evaluation Criteria
  A: Both in single color and in mixed colors, cissing did not occur, and solid areas were formed.
  B: In mixed colors, cissing did not occur, and solid areas were formed; in single color, however, cissing occurred and solid areas were not formed.
  C: Both in single color and in mixed colors, cissing occurred and solid areas were not formed.

Anti-Mottling Property

Each of the nonaqueous inkjet ink compositions in Examples 1 to 12 and Comparative Examples 1 to 4 was printed solid in mixed colors (red, blue, green) on a polyvinyl chloride sheet (product name: MPI 1000 Series, manufactured by Avery Dennison Corporation) in a standard mode, and the result was visually evaluated for mottled images (blotchy patterns).
Evaluation Criteria
  A: Mottling did not occur.
  B: Slight mottling occurred.
  C: A lot of mottling occurred.

Discharge Stability

Each of the nonaqueous inkjet ink compositions in Examples 1 to 12 and Comparative Examples 1 to 4 was printed on a polyvinyl chloride sheet (product name: MPI 1000 Series, manufactured by Avery Dennison Corporation), and the result was evaluated based on the number of sheets having unprinted areas.
Evaluation Criteria
  A: Unprinted areas occurred on or after the $71^{st}$ sheet, or unprinted areas did not occur until the $100^{th}$ sheet.
  B: Unprinted areas occurred on or between the $51^{st}$ and $70^{th}$ sheets.
  C: Unprinted areas occurred on or between the $31^{st}$ and $50^{th}$ sheets.
  D: Unprinted areas occurred on or before the $30^{th}$ sheet.

Ease of Maintenance

Each of the nonaqueous inkjet ink compositions in Examples 1 to 12 and Comparative Examples 1 to 4 was injected into a silicone tube of 5 mm in inner diameter and 20 cm in length, and then let stand for 5 days at 25° C., to allow solid ink matter to form inside the tube. Next, each of the ink compositions was injected again into the tube to evaluate whether the solid matter would dissolve again and the ink would flow out, according to the criteria below.
Evaluation Criteria
  A: The ink flowed out quickly.
  B: It took some time before the ink flowed out.
  C: The ink flowed out partially.
  D: The blockage was not resolved.

TABLE 1

| | | Examples | | | | | | | |
|---|---|---|---|---|---|---|---|---|---|
| | | 1 | 2 | 3 | 4 | 5 | 6 | 7 | 8 |
| Pigments | MA7 | 3.50 | 3.50 | 3.50 | 3.50 | 3.50 | 3.50 | 3.50 | 3.50 |
| | G01 | | | | | | | | |
| | RGT | | | | | | | | |
| | D7110F | | | | | | | | |
| Dispersants | PB822 | | | | | | | | |
| | SOLSPERSE 56000 | | | | | | | | |
| | SOLSPERSE 39000 | 1.40 | 1.40 | 1.40 | 1.40 | 1.40 | 1.40 | 1.40 | 1.40 |
| Resins | BR-87 | 5.00 | 5.00 | 5.00 | 5.00 | 5.00 | 5.00 | 5.00 | 5.00 |
| | BR-60 | 1.25 | 1.25 | 1.25 | 1.25 | 1.25 | 1.25 | 1.25 | 1.25 |
| | E15/45 | 0.50 | 0.50 | 0.50 | 0.50 | 0.50 | 0.50 | 0.50 | 0.50 |
| Solvents | Diethylene glycol diethyl ether | 34.85 | | 38.35 | 36.85 | 39.85 | 33.85 | | 21.85 |
| | Diethylene glycol ethyl methyl ether | 30.00 | 30.00 | 30.00 | 30.00 | 30.00 | 30.00 | 30.00 | 30.00 |
| | Diethylene glycol dibutyl ether | | 34.85 | | | | | 36.85 | 15.00 |
| | Propylene carbonate | 7.00 | 7.00 | 3.50 | 5.00 | 5.00 | 5.00 | 5.00 | 5.00 |
| | Tetraethylene glycol dimethyl ether | 15.00 | 15.00 | 15.00 | 15.00 | 12.00 | 18.00 | 15.00 | 15.00 |
| | γ-butyrolactone | 1.50 | 1.50 | 1.50 | 1.50 | 1.50 | 1.50 | 1.50 | 1.50 |
| Total | | 100.00 | 100.00 | 100.00 | 100.00 | 100.00 | 100.00 | 100.00 | 100.00 |

TABLE 1-continued

| | | | | | | | | |
|---|---|---|---|---|---|---|---|---|
| Diethylene glycol dialkyl ether/propylene carbonate | 9.26 | 9.26 | 19.53 | 13.37 | 13.97 | 12.77 | 13.37 | 13.37 |
| Viscosity (mPa · s) | 6.1 | 6.2 | 5.8 | 6.0 | 5.9 | 6.1 | 6.1 | 6.0 |
| Solid filling property | A | A | A | A | A | A | A | A |
| Cissing inhibition property of ink | A | A | A | A | B | A | A | A |
| Anti-mottling property | B | B | A | A | A | B | B | A |
| Discharge stability | A | A | A | A | A | A | A | A |
| Ease of maintenance | A | A | A | A | A | A | A | A |

| | | Examples | | | | Comparative Examples | | | |
|---|---|---|---|---|---|---|---|---|---|
| | | 9 | 10 | 11 | 12 | 1 | 2 | 3 | 4 |
| Pigments | MA7 | 3.50 | | | | 3.50 | 3.50 | 3.50 | 3.50 |
| | G01 | | 3.00 | | | | | | |
| | RGT | | | 3.00 | | | | | |
| | D7110F | | | | 3.00 | | | | |
| Dispersants | PB822 | | 1.20 | | | | | | |
| | SOLSPERSE 56000 | | | 1.20 | 1.20 | | | | |
| | SOLSPERSE 39000 | 1.40 | | | | 1.40 | 1.40 | 1.40 | 1.40 |
| Resins | BR-87 | 5.00 | 4.20 | 4.50 | 5.00 | 5.00 | 5.00 | 5.00 | 5.00 |
| | BR-60 | 1.25 | 1.10 | 1.13 | 1.25 | 1.25 | 1.25 | 1.25 | 1.25 |
| | E15/45 | 0.50 | 0.50 | 0.50 | 0.50 | 0.50 | 0.50 | 0.50 | 0.50 |
| Solvents | Diethylene glycol diethyl ether | 26.85 | 28.50 | 28.17 | 27.55 | 39.85 | 31.85 | 47.85 | 21.85 |
| | Diethylene glycol ethyl methyl ether | 40.00 | 40.00 | 40.00 | 40.00 | 30.00 | 30.00 | 30.00 | 30.00 |
| | Diethylene glycol dibutyl ether | | | | | | | | |
| | Propylene carbonate | 5.00 | 5.00 | 5.00 | 5.00 | 2.00 | 10.00 | 5.00 | 5.00 |
| | Tetraethylene glycol dimethyl ether | 15.00 | 15.00 | 15.00 | 15.00 | 15.00 | 15.00 | 4.00 | 30.00 |
| | γ-butyrolactone | 1.50 | 1.50 | 1.50 | 1.50 | 1.50 | 1.50 | 1.50 | 1.50 |
| | Total | 100.00 | 100.00 | 100.00 | 100.00 | 100.00 | 100.00 | 100.00 | 100.00 |
| Diethylene glycol dialkyl ether/propylene carbonate | | 13.37 | 13.70 | 13.63 | 13.51 | 34.93 | 6.19 | 15.57 | 10.37 |
| Viscosity (mPa · s) | | 6.0 | 6.0 | 6.0 | 6.0 | 5.7 | 6.1 | 5.8 | 6.5 |
| Solid filling property | | A | A | A | A | A | B | B | A |
| Cissing inhibition property of ink | | A | A | A | A | B | A | C | A |
| Anti-mottling property | | A | A | A | A | B | C | B | C |
| Discharge stability | | A | A | A | A | A | B | A | A |
| Ease of maintenance | | A | A | A | A | A | A | D | A |

Examples 1 to 12 conforming to the present invention demonstrated excellent solid filling property, cissing inhibition property of ink, anti-mottling property, discharge stability, and ease of maintenance. In particular, Examples 3, 4, 8 and to 12 received rating A for all of the above because their "diethylene glycol dialkyl ether/propylene carbonate" ratio was 13.0 or higher and tetraethylene glycol dialkyl ether content was 13.0% by mass or higher. It should be noted that Example 5 received rating B for cissing inhibition property of ink due to a relatively lower content of tetraethylene glycol dimethyl ether.

By contrast, Comparative Example 1, where the "diethylene glycol dialkyl ether/propylene carbonate" ratio was too high, received rating B for two items of cissing inhibition property of ink and anti-mottling property. Comparative Example 2, where the "diethylene glycol dialkyl ether/propylene carbonate" ratio was too low, received rating B for solid filling property and discharge stability, and rating C for anti-mottling property.

In addition, Comparative Example 3, where the content of tetraethylene glycol dialkyl ether was low, exhibited particularly poor cissing inhibition property of ink and ease of maintenance. Comparative Example 4, where the content of tetraethylene glycol dialkyl ether was too high, demonstrated particularly poor anti-mottling property.

What is claimed is:

1. A nonaqueous inkjet ink composition containing acrylic-based resin, pigment, pigment dispersant, and organic solvent, wherein the nonaqueous inkjet ink composition contains, as the organic solvent:
   propylene carbonate by 1.0 to 7.0% by mass in the ink composition;
   diethylene glycol dialkyl ether in a manner that a content of diethylene glycol dialkyl ether relative to that of propylene carbonate, or "diethylene glycol dialkyl ether/propylene carbonate," falls between 9.0 and 20.0 based on mass ratio; and
   tetraethylene glycol dialkyl ether by 5.0 to 25.0% by mass in the ink composition.

2. The nonaqueous inkjet ink composition according to claim 1, wherein the diethylene glycol dialkyl ether comprises diethylene glycol ethyl methyl ether and/or diethylene glycol diethyl ether.

3. The nonaqueous inkjet ink composition according to claim 1, wherein the acrylic-based resin is formulated in a manner that it contains acrylic-based resin (A) whose glass transition temperature is 90 to 110° C. and mass-averaged molecular weight is 20,000 to 80,000, and acrylic-based resin (B) whose glass transition temperature is 65 to 85° C. and mass-averaged molecular weight is 50,000 to 80,000, at a ratio (A)/(B) of 70 to 90/10 to 30.

4. The nonaqueous inkjet ink composition according to claim 1, containing vinyl chloride-vinyl acetate-based resin.

5. The nonaqueous inkjet ink composition according to claim 2, wherein the acrylic-based resin is formulated in such a way that it contains acrylic-based resin (A) whose glass transition temperature is 90 to 110° C. and mass-averaged molecular weight is 20,000 to 80,000, and acrylic-based resin (B) whose glass transition temperature is 65 to 85° C. and mass-averaged molecular weight is 50,000 to 80,000, at a ratio (A)/(B) of 70 to 90/10 to 30.

6. The nonaqueous inkjet ink composition according to claim 2, containing vinyl chloride-vinyl acetate-based resin.

7. The nonaqueous inkjet ink composition according to claim 3, containing vinyl chloride-vinyl acetate-based resin.

8. The nonaqueous inkjet ink composition according to claim 5, containing vinyl chloride-vinyl acetate-based resin.

9. The nonaqueous inkjet ink composition according to claim 1, wherein the content of diethylene glycol dialkyl ether relative to that of propylene carbonate falls between 12.0 and 20.0 based on mass ratio.

10. The nonaqueous inkjet ink composition according to claim 2, wherein the content of diethylene glycol dialkyl ether relative to that of propylene carbonate falls between 12.0 and 20.0 based on mass ratio.

11. The nonaqueous inkjet ink composition according to claim 3, wherein the content of diethylene glycol dialkyl ether relative to that of propylene carbonate falls between 12.0 and 20.0 based on mass ratio.

12. The nonaqueous inkjet ink composition according to claim 4, wherein the content of diethylene glycol dialkyl ether relative to that of propylene carbonate falls between 12.0 and 20.0 based on mass ratio.

* * * * *